July 7, 1936.  E. HÖRNER  2,047,070
DEVICE FOR PHOTOGRAPHIC SURVEY FROM AIRCRAFT
Filed April 20, 1933    2 Sheets-Sheet 1

Inventor:
Erich Hörner
By Emil Bönnelycke
Attorney

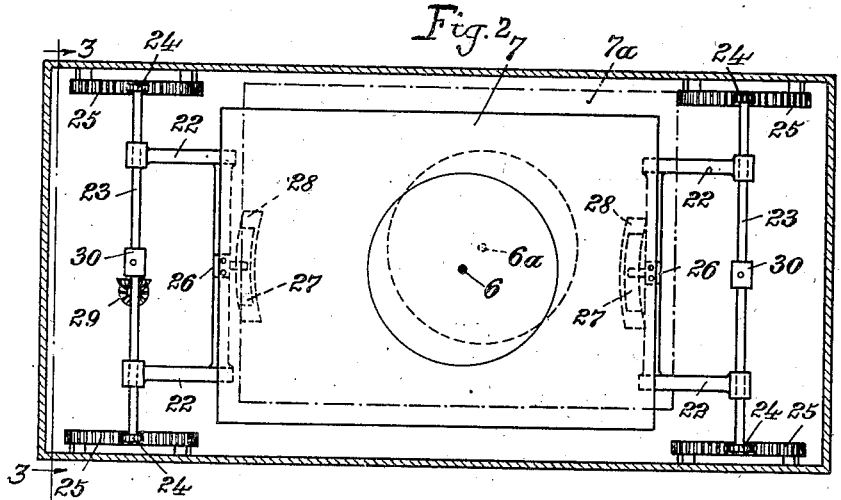
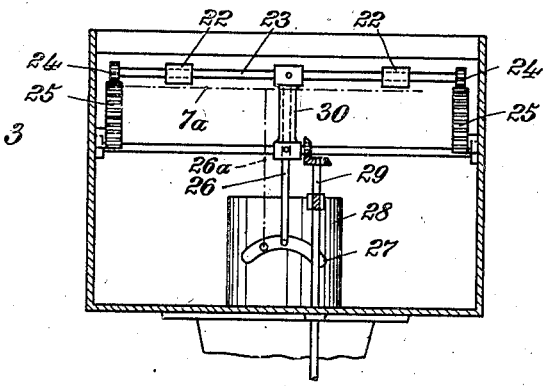
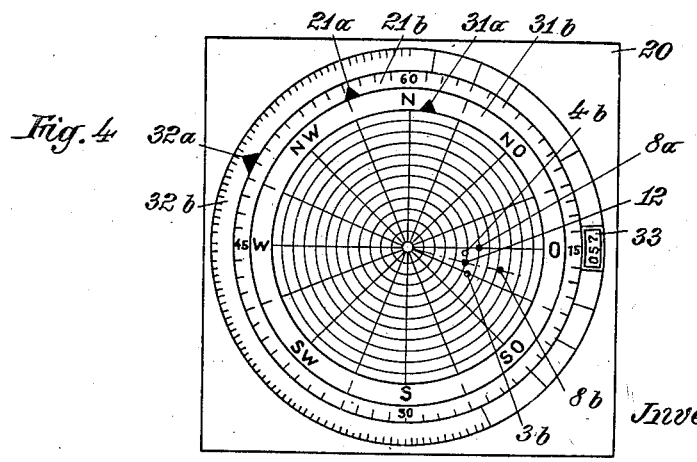

Patented July 7, 1936

2,047,070

UNITED STATES PATENT OFFICE 2,047,070

DEVICE FOR PHOTOGRAPHIC SURVEY FROM AIRCRAFT

Erich Hörner, Berlin, Germany

Application April 20, 1933, Serial No. 667,121
In Germany February 22, 1927

8 Claims. (Cl. 95—12.5)

This invention relates to an apparatus for the photographing of territory from aircraft, particularly for surveying purposes for which application has been filed in Germany on February 22, 1927.

In territorial surveys it is known to take photographs from an aircraft of the territory to be surveyed, from points at certain distances apart, which photographs partly overlap. In this procedure each pair of successive pictures forms a stereoscopic photograph of that territorial area which is represented on the two plates. In mapping the survey, this stereoscopic picture is placed in a stereoscopic projector to produce an optical model of the photographed area, and from this model the map is drawn or a relief can be prepared.

In this utilization of stereoscopic photographs it is important to note the position in space of each plate at the instant of exposure and its optical and physical inclination in order that the pictures can be brought into exactly the same position in the projector. It is known that aircraft are subject to continuous deviations in flight so that the photographic plate or film at the instant of exposure in general does not lie in a horizontal plane; also the inclinations of all the plates vary from each other.

The present invention has for its object to provide an apparatus permitting the position of each plate to the optico-physical level at the instant of exposure to be recorded on the plate itself in such a manner that this position can be reproduced in the stereoscopic projector with the plate oriented as in its natural position in space.

It has already been proposed in order to determine the exposure position of survey photographs taken from aircraft, to record the position of indicators, as for example those of clinometers or pendulums, compasses, elevation barometers, sun-position indicators, simultaneously with the exposure.

If the exposure date (for example fore and aft inclination, transverse inclination, etc.) are known, (for example by recording the readings of instruments) then the nadir image can be obtained graphically or by calculation, and the first adjustment in the mapping apparatus performed with the aid of this nadir image. However, these calculations or graphical determinations require time.

The object of the invention is to appreciably reduce these operations and to render territorial surveying more economical than heretofore.

The invention is carried out in such a way that each photographing of a territorial area, but independently thereof, the indication of the nadir point is photographed, which then can be directly transferred to the territory photograph. In applying this method there is employed an apparatus which indicates the position in space of the plate exposed and photographically determines this position.

The apparatus consists of a clinometer instrument operating by gravity, to wit, a spirit level, with which a sun-dial device cooperates in such a manner that it throws the shadow of a spot on the dial of the level, which shadow maintains the same distance from the axis of the clinometer instrument during the whole exposure as long as the instrument does not change its horizontal position. The position of the shadow and other indications of the clinometer are photographed on a separate plate so that they can be exactly and clearly recognized. The photographic camera used for this purpose has the same width of field as the camera for photographing the territory.

The accompanying drawings illustrate by way of example apparatus embodying the invention. In these drawings:

Fig. 2 is a top view partly in section of the apparatus.

Fig. 3 is a sectional view taken on line 3—3 of Fig. 2.

Fig. 4 represents a photograph of the indicating means.

Figure 1:
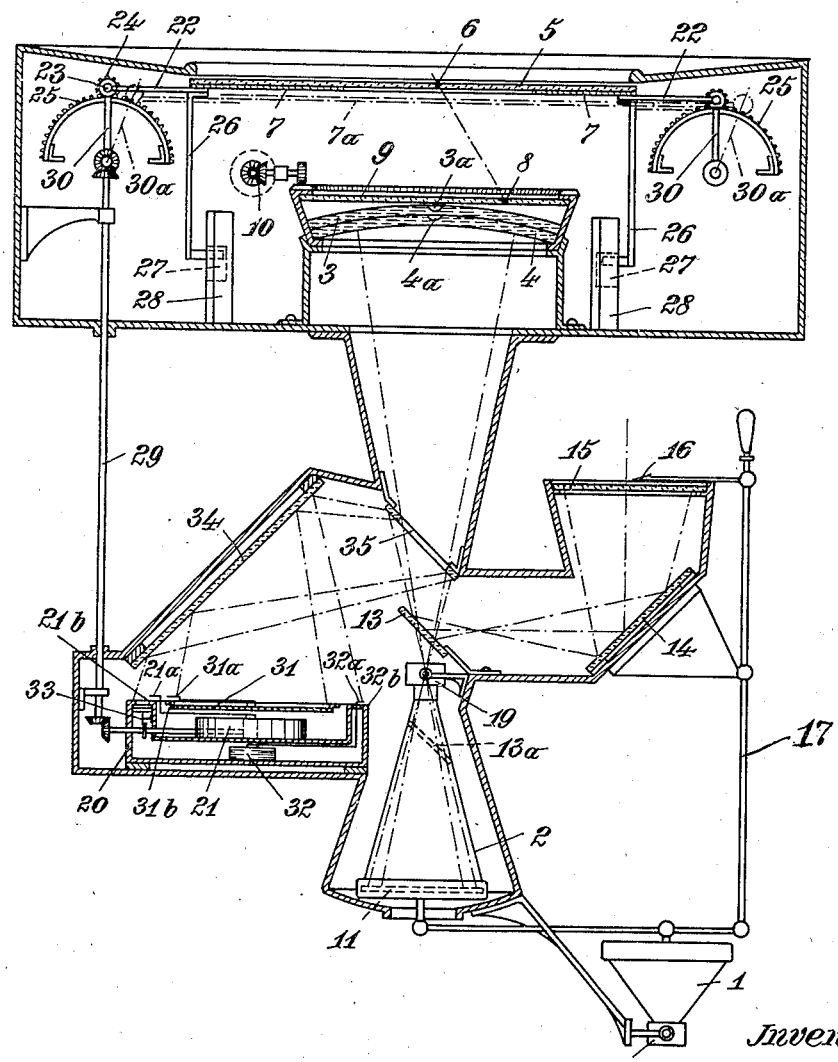
Figure 1 is a sectional view of the entire apparatus.

The camera 1 serves the purpose of photographing the ground or landscape and the camera 2 is for the purpose of photographing the indications for instrument readings. Both cameras 1 and 2 will have the same picture widths and are so coupled with each other that their longitudinal axis will always be parallel to each other. Above the camera 2, there is provided as a clinometer device, two spirit levels 3 and 4 of different inertias in which each has an air bubble 3a and 4a which have different rapid movements when the levels swing out of their positions of rest. Above the spirit levels, there is a sun dial device. The latter consists of a glass plate 5 with a shadow projecting means as for example the black point 6 which in the vertical position will lie in the axis of the spirit levels. The plate 5 is carried by a plate 7 which as will be further described is adjustable in accordance with the position of the sun. By this construction the result is to be attained that the shadow 8 of the point 6 shall be thrown on the glass plate 9 the same distance from the center of the plate 9 in every position of the sun.

If the apparatus remains at rest, the shadow remains at one and the same point. If it is turned in a horizontal direction, the shadow moves in a circle, the center of which is the middle point of the plate or surface 9. By rotating the apparatus, which can be effected automatically by a compass, otherwise manually by means of the actuator 10, the shadow can always be kept on one and the same point on the plate 9 notwithstanding rotation of the apparatus.

Each time that the camera 1 takes a picture the camera 2 will at the same time photograph the spirit levels and the sun dial device on a plate or film 11. Fig. 4 represents a photograph, somewhat enlarged, of a picture as taken by the camera 2. If the plate 11 and therewith also the plate of the camera 1 were absolutely horizontal at the time of taking pictures then the photograph in accordance with Fig. 4 would show the bubbles of the spirit levels exactly in the center and the shadow 8 will be the point 8a. However, if the photographic plates are not horizontal due to the angular position of an airplane, for instance, then the air bubble 3a will be shifted to 3b, and the air bubble 4a to 4b and the shadow 8 to 8b, Fig. 4. The center point would then lie in the point 12 and in a similar manner the photograph taken by the camera 1 can be transposed. It is, however, possible that an airplane may be flying in a plane far off from the horizontal so that camera 1 would then make an unusable picture. In order to prevent the foregoing, the following arrangement is utilized.

A mirror 13 is provided above the camera 2 which permits the rays coming from the spirit levels to pass therethrough to the camera 2 as well as to throw the rays that is a representation of the spirit levels and the sun dial device under the observation plate 15 over which there is provided indicator 16. The breaking of the rays passing through the mirror 13 is compensated for by the provision of a glass plate 13a in the camera 2. The indicator 16 is secured to a lever and rod arrangement 17, the latter of which is coupled to the cameras 1 and 2. Camera 1 can swing around its center point of the objective 18 and the camera 2 can swing around the center point of its objective 19. Now, if an observer notes that the position of the air bubble of the spirit levels and the shadow of the sun dial device relative to the indicator 16 will result in an unusable photograph due to the airplane flying in a non-horizontal position the observer will then operate the lever and rod arrangement 17 by means of its handle in order to adjust the cameras 1 and 2 before actually taking the picture so that the longitudinal axes of the cameras 1 and 2 will be in their proper positions.

The sun dial device is operated by a chronometer 21 arranged in the casing 20. To the plate 7, rods 22 are secured which are carried by shafts 23. On the shafts 23 are located small gear wheels 24 which mesh with stationary toothed quadrants 25 so that plate 7 can always be adjusted in a parallel relation. Rods 26 are also secured to the plate 7 and these rods have bent ends projecting into the arcuate recesses 27 of the plates 28. The plates 28 are curved and the arcuate recesses 27 corresponding in curvature with the path of the sun. The chronometer 21 can rotate the gears 24 on their tracks 25 by means of the rods 29 and 30 which are connected with the shaft 23.

Now, if the chronometer 21 has adjusted the rod 30 in a position as for example indicated by the dot and dash line 30a, the plate 7 will not alone be moved to the right but it will assume a somewhat lower position as indicated by the dot and dash lines 7a. In this position the rods 26 are also moved down to the position indicated by the dot and dash line 26a, Fig. 3, so that the plate 7 finally will be moved into the position shown in Fig. 2 by the dot and dash line 7a. In this way the point 6 will be moved over to point 6a so that its shadow will also be adjusted so that the shadow will likewise fall on the point 8 on the surface or plate 9.

The indicator 21a of the chronometer 21 will be moved over a ring formed dial 21b. The casing 20 also contains other instruments, namely, a compass 31, of which its indicator 31a also moves over a ring formed graduated member 31b, further a barometer 32 with an indicator 32a which likewise moves over a ring formed graduated member 32b, and finally a numeral device 33, of known type, which is operated by the chronometer 21. The graduated ring formed devices 21b, 31b and 32b and the positions of the dials 21a, 31a and 32a will be thrown on the plate of the camera 2 by means of the mirrors 34 and 35. The mirror 35 is only in the shape of a ring so that the rays coming from the spirit levels can uninterruptedly pass therethrough to the camera 2. On the taking of each picture of the spirit levels and the sun dial compass, there will be taken at the same time the indications on the members 21b, 31b and 32b so that on the photograph as shown in Fig. 4, the middle part will show the positions of the spirit level bubbles and around these will appear the rings 21b, 31b and 32b together with the dial positions of the indicators 21a, 31a, and 32a. By means of the part 33 the number of the photograph will also be recorded thereon from the numeral device.

I claim as my invention:

1. Apparatus for use in aerial photographic surveying, comprising a camera for photographing territory, a clinometer device with indicating means, a camera so aligned with the clinometer device as to be able to photograph its indications, said camera having a picture width similar to that of the survey camera, and means connecting the two cameras for holding their focal axes parallel.

2. Apparatus according to claim 1, in which the clinometer device comprises at least two superposed spirit levels of different inertias.

3. Apparatus for use in aerial photographic surveying, comprising a camera for photographing territory, a clinometer device with indicating means, a camera so aligned with the clinometer device as to be able to photograph its indications, said camera having a picture width similar to that of the survey camera, a sun-dial device adapted to throw a spot shadow on the indicating means of the clinometer device, and means for moving the shadow-throwing spot of the sun-dial device relatively to solar movement that the spot shadow remains stationary with respect to the clinometer indicating means as long as the clinometer device remains horizontal.

4. Apparatus according to claim 3, comprising also a compass adapted to control the apparatus including the clinometer.

5. Apparatus according to claim 3 in which a compass is provided adapted to control the apparatus and an optical system comprising a centrally apertured mirror arranged with its aperture aligned with the focal axis of the clinometer camera and the clinometer and adapted to throw an image of the compass dial into said camera concentrically with the image of the clinometer indicating means.

6. Apparatus for use in aerial photographic surveying comprising a camera for photographing territory, a clinometer device with indicating means, a camera so aligned with the clinometer device as to be able to photograph its indications, said camera having a picture width similar to that of the survey camera, a sun-dial device adapted to throw a spot shadow on the indicating means of the clinometer device, means for moving the shadow-throwing spot of the sun-dial device relatively to solar movement that the spot shadow remains stationary with respect to the clinometer indicating means as long as the clinometer device remains horizontal, a semi-reflecting and semi-transparent disk in front of the clinometer camera, and a screen to throw an image of the clinometer indicating means on the screen by the disk.

7. Apparatus according to claim 6, comprising also an indicator movable over the screen and connected to the territory photographing camera and the clinometer camera.

8. Apparatus according to claim 3 in which the clinometer camera and the territory photographing camera have means for making corresponding coordinate survey marks on the pictures taken thereby.

ERICH HÖRNER.